US009896363B2

(12) United States Patent
Seidl et al.

(10) Patent No.: US 9,896,363 B2
(45) Date of Patent: Feb. 20, 2018

(54) MOVING BED BIOFILM REACTOR FOR WASTE WATER TREATMENT SYSTEM

(71) Applicant: Headworks Bio Inc., Houston, TX (US)

(72) Inventors: Gerald Seidl, Houston, TX (US); Siva Angappan, Victoria (CA); Ranjit Nair, Houston, TX (US); Robert S. Reimers, Houston, TX (US); Jan Oleszkiewicz, Winnipeg (CA); Charan Tej Tanneru, Houston, TX (US)

(73) Assignee: Headworks Bio Inc., Houston, TX (US)

( * ) Notice: Subject to any disclaimer, the term of this patent is extended or adjusted under 35 U.S.C. 154(b) by 0 days.

(21) Appl. No.: 15/085,993

(22) Filed: Mar. 30, 2016

(65) Prior Publication Data
US 2016/0289107 A1    Oct. 6, 2016

Related U.S. Application Data

(60) Provisional application No. 62/143,548, filed on Apr. 6, 2015.

(51) Int. Cl.
*C02F 3/30* (2006.01)
*C02F 3/08* (2006.01)
(Continued)

(52) U.S. Cl.
CPC .............. *C02F 3/30* (2013.01); *C02F 3/085* (2013.01); *C02F 1/004* (2013.01); *C02F 1/24* (2013.01);
(Continued)

(58) Field of Classification Search
CPC .......... C02F 3/30; C02F 3/085; C02F 3/2833; C02F 3/302; C02F 2203/002;
(Continued)

(56) References Cited

U.S. PATENT DOCUMENTS 7,189,323 B2    3/2007   Lofqvist et al.
8,758,613 B2    6/2014   Arbel et al.
(Continued)

FOREIGN PATENT DOCUMENTS

CN    101955294    6/2013
CN    103288300    9/2013
(Continued)

OTHER PUBLICATIONS

Dr Jan Oleszkiewicz; "Aqwise Extending Nature's Capacity"; 2013; http://www.aqwise.com/technologies/dacs/; last accessed Mar. 30, 2016.

*Primary Examiner* — Fred Prince
(74) *Attorney, Agent, or Firm* — Fletcher Yoder, P.C.

(57) ABSTRACT

In one embodiment, a method includes receiving wastewater having a first total organic carbon (TOC) at a wastewater treatment system comprising a reactor system, wherein the reactor system comprises an anaerobic moving bed biofilm reactor (MBBR) and an aerobic MBBR. The method further includes treating the wastewater in the anaerobic MBBR, wherein the anaerobic MBBR comprises first bio-carriers configured to degrade at least a portion of the first TOC in the wastewater to generate a first treated wastewater and biogas, wherein the first treated wastewater has a second TOC that is less than the first TOC. The method also includes providing the biogas to an external system.

35 Claims, 11 Drawing Sheets

(51) Int. Cl.
*C02F 3/28* (2006.01)
*C02F 1/24* (2006.01)
*C02F 9/00* (2006.01)
C02F 1/00 (2006.01)
C02F 3/00 (2006.01)

(52) U.S. Cl.
CPC ............ *C02F 3/006* (2013.01); *C02F 3/2806* (2013.01); *C02F 3/2833* (2013.01); *C02F 3/301* (2013.01); *C02F 3/302* (2013.01); *C02F 9/00* (2013.01); *C02F 2203/002* (2013.01); *C02F 2209/005* (2013.01); *C02F 2209/03* (2013.01); *C02F 2209/09* (2013.01); *C02F 2209/20* (2013.01); *C02F 2209/40* (2013.01); *C02F 2303/10* (2013.01); *C02F 2303/24* (2013.01); *C02F 2305/06* (2013.01); *Y02W 10/15* (2015.05); *Y02W 10/30* (2015.05)

(58) Field of Classification Search
CPC ............ C02F 2209/005; C02F 2209/03; C02F 2209/40; C02F 2303/10; C02F 1/004; C02F 1/24; C02F 3/006; C02F 3/2806; C02F 3/301; C02F 9/00; C02F 2209/09; C02F 2209/20; C02F 2303/24; C02F 2305/06; Y02W 10/30; Y02W 10/15
USPC ....... 210/603, 605, 610, 611, 614, 615, 616, 210/617, 621, 630, 150, 151, 252, 259, 210/903
See application file for complete search history.

(56) References Cited

U.S. PATENT DOCUMENTS

| | | | | |
|---|---|---|---|---|
| 2002/0079266 | A1* | 6/2002 | Ainsworth | C02F 3/28 210/603 |
| 2004/0244715 | A1* | 12/2004 | Schreier | A01K 63/045 119/259 |
| 2011/0079554 | A1* | 4/2011 | Ren | C02F 3/085 210/605 |
| 2011/0089106 | A1* | 4/2011 | Arbel | C02F 3/2806 210/605 |
| 2013/0319940 | A1* | 12/2013 | Josse | C02F 3/286 210/622 |
| 2014/0026039 | A1* | 1/2014 | Lundgren | G06F 17/212 715/244 |
| 2014/0027373 | A1* | 1/2014 | Josse | C02F 3/282 210/605 |

FOREIGN PATENT DOCUMENTS

| | | |
|---|---|---|
| CN | 104609647 A * | 5/2015 |
| CN | 20131067433 | 12/2015 |

* cited by examiner

MOVING BED BIOFILM REACTOR FOR WASTE WATER TREATMENT SYSTEM

This application is a Non-provisional patent application of U.S. Provisional Patent Application No. 62/143,548, entitled "MOVING BED BIOFILM REACTOR FOR WASTE WATER TREATMENT SYSTEM", filed Apr. 6, 2015, which is incorporated herein by reference in its entirety.

BACKGROUND OF THE INVENTION

The present invention relates generally to the field of wastewater treatment systems. More particularly, the invention relates to techniques for decreasing total organic content of high strength wastewaters using a combination of anaerobic and aerobic treatment.

In the field of wastewater treatment, a number of different system types are known and are currently in use. In general, these may consist of primary treatment, secondary treatment, and, where desired, tertiary treatment. Primary treatment is often limited to screening and suspended solids removal. Secondary treatment may include a wide range of biological processes, such as biochemical oxygen demand (BOD) reduction, nitrification, de-nitrification, and so forth. Following secondary treatment, further settling, filtering, polishing and other operations may be performed before the wastewater is advanced to final discharge.

In a number of the processes used for wastewater treatment, particulate matter may be caused to precipitate from the wastewater and collect on the bottom of a vessel. Reactor vessels for secondary treatment, for example, may hold wastewater in a reactor vessel, along with biological support media. The biological support media includes bacteria that proliferate and serve to treat the water in the reactor vessel by circulation of the water over the support media. In addition to the biological support media, the reactor vessel may include aeration systems to promote the growth and sustenance of the microbial growth. For example, the aeration systems may bubble compressed air through the wastewater, feeding the bacteria and causing the media to move so as to adequately circulate the wastewater (and the substrate in the wastewater such as BOD) over the biological growth, thereby treating the wastewater. Therefore, the energy demands associated with the secondary treatment process generally increase the overall operational costs for wastewater treatment. Moreover, secondary treatment of the wastewater generates debris and sludge (waste biomass), which generally is removed by clarifier or a dissolved air flotation (DAF).

BRIEF DESCRIPTION OF THE INVENTION

In one embodiment, a method includes receiving wastewater having a first total organic carbon (TOC) at a wastewater treatment system comprising a reactor system, wherein the reactor system comprises an anaerobic moving bed biofilm reactor (MBBR) and an aerobic MBBR. The method further includes treating the wastewater in the anaerobic MBBR, wherein the anaerobic MBBR comprises first bio-carriers configured to degrade at least a portion of the first TOC in the wastewater to generate a first treated wastewater and biogas, wherein the first treated wastewater has a second TOC that is less than the first TOC. The method also includes providing the biogas to an external system.

In a second embodiment, a water treatment system includes a reactor system disposed downstream from and fluidly coupled to a primary treatment system, wherein the primary treatment system is configured to treat a wastewater having a first total organic carbon (TOC). The reactor system includes an anaerobic moving bed biofilm reactor (MBBR) configured to receive the wastewater from the primary treatment system, the anaerobic MBBR comprising first bio-carriers configured to degrade at least a portion of the first TOC in the wastewater to generate a first treated wastewater and biogas, wherein the first treated wastewater comprises a second TOC that is less than the first TOC. The reactor system additionally includes an aerobic MBBR disposed downstream from and fluidly coupled to the anaerobic MBBR. The reactor system also includes a fluid conduit fluidly coupling the reactor to an external system to provide the biogas to the external system.

In a third embodiment, a reactor system includes an anaerobic moving bed biofilm reactor (MBBR) configured to receive wastewater having a first total organic carbon (TOC), the anaerobic MBBR comprising first bio-carriers configured to degrade at least a portion of the first TOC in the wastewater to generate a first treated wastewater and biogas, wherein the first treated wastewater comprises a second TOC that is less than the first TOC. The reactor system additionally includes an aerobic MBBR disposed downstream from and fluidly coupled to the anaerobic MBBR. The reactor system also includes a buffer reactor fluidly coupled to the anaerobic MBBR and the aerobic MBBR, and disposed between the anaerobic MBBR and the aerobic MBBR, wherein the buffer reactor is configured to receive the first treated wastewater and degrade at least a portion of the second TOC to generate a second treated wastewater.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Wastewater treatment systems generally include several system components that treat and condition wastewater for disposal into the environment (e.g., lakes, rivers, ponds, etc.) and for a variety of uses (e.g., irrigation, recycling of water). There is an increasing need for improved wastewater treatment systems that can significantly reduce the footprint of the overall system, while providing a high level of solids and biological material removal. There is a particular need for systems that can integrate various secondary treatment approaches to reduce an overall size of the secondary treatment components, thereby generating a compact wastewater treatment system that may be used in compact spaces. This may be advantageous in geographical locations that have limited real estate space for installation of wastewater treatment systems. In addition, it may be desirable to configure the system to recover energy (e.g., biogas) generated during treatment of the wastewater, and use the recovered energy to operate various system components. As such, the overall equipment and operation costs of the system may be decreased.

Figure 1:
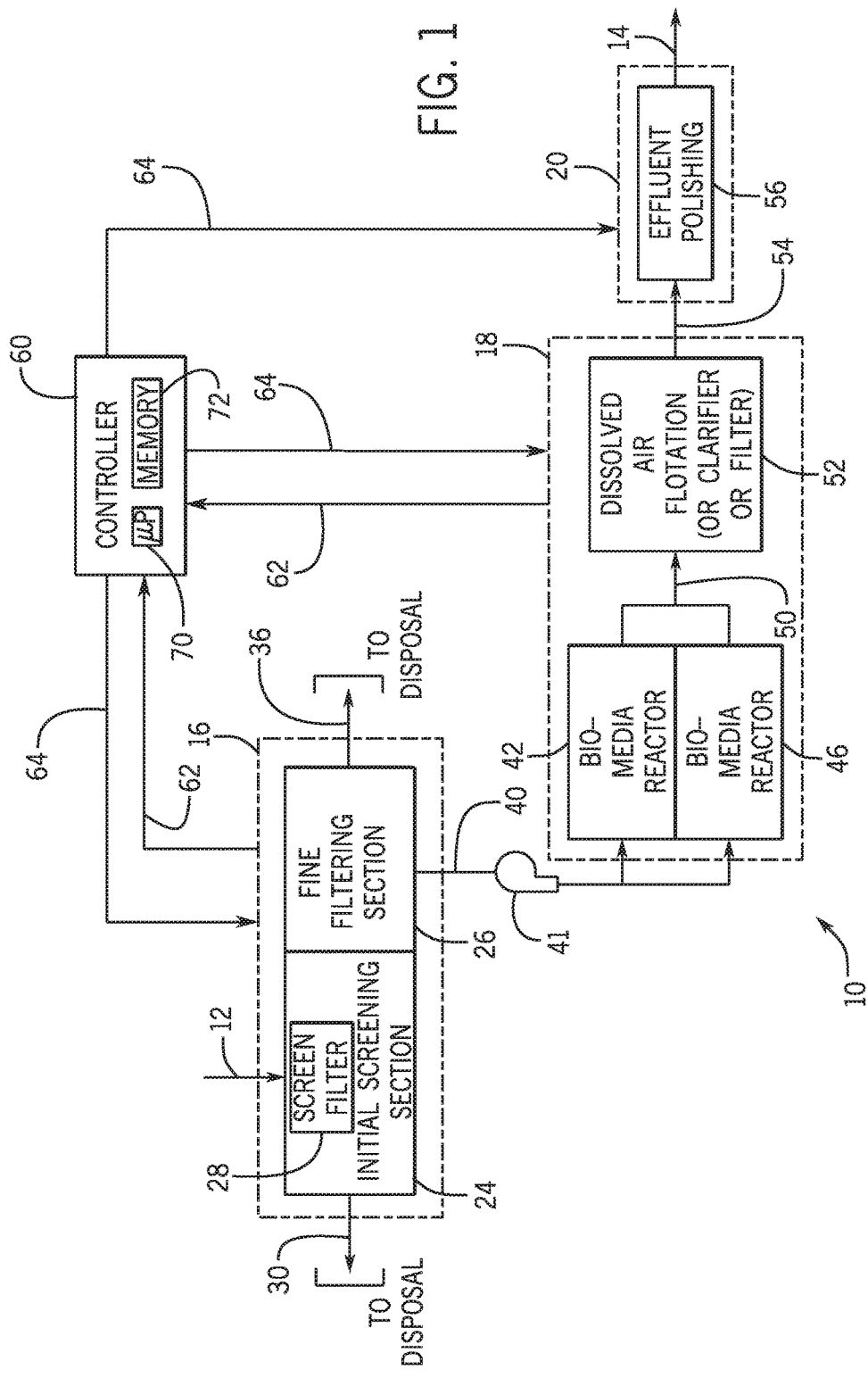
FIG. 1 is a diagrammatical overview of an embodiment of a wastewater treatment system including a primary treatment section, a secondary treatment section, and a tertiary treatment section.

Turning now to the drawings, and referring first to FIG. 1, a wastewater treatment system 10 is illustrated diagrammatically. The system 10 is designed to receive wastewater 12 and to output treated fluid 14. In the illustrated embodiment, the system 10 includes a primary treatment section 16, a secondary treatment section 18, and a tertiary treatment section 20. However, in certain embodiments, the system 10 does not include the tertiary treatment section 20. As described in further detail below, the configuration of the secondary treatment section 16 may include a reactor vessel 22 that utilizes both aerobic and anaerobic digestion to treat the wastewater 12. For example, the reactor vessel may be an integrated anaerobic and aerobic reactor. Integrating the anaerobic and aerobic reactors may result in a more compact secondary treatment section compared to secondary treatments sections that utilize standalone anaerobic and aerobic reactors (e.g., reactors that are separate structures). The compact reactor vessel may decrease the overall space occupied by the system 10. Therefore, systems that include integrated reactor vessels, such as the system 10, may be used in geographical locations that have limited real estate for installation of wastewater treatment systems, or that may benefit from having a smaller footprint. In addition to being compact, the integrated reactor vessel may be configured to recover energy (e.g., biogas) generated during the treatment of the wastewater 12, and using the recovered energy to operate components of the system 10. As such, the overall operational costs and footprint of the system 10 may be decreased compared to wastewater treatment systems that do not recover the biogas. Moreover, the combined aerobic and anaerobic reactor vessel of the present disclosure may provide enhanced operability and efficiency of the system 10, and further reduce maintenance costs.

During operation of the system 10, the wastewater 12 is introduced to the primary treatment section 16. The primary treatment section 16 may include an initial screening section 24 and a fine section 26. The wastewater 12 flows through a screen 28 disposed within the initial screening section 24, and undergoes initial screening. Various types of screens, such as the bar screens 28, are known and commercially available. For example, various types of bar or screens may be used for the screens 28, such as those described in U.S. Pat. Nos. 6,666,977; 6,719,912; 7,147,784; and 7,220,361, all assigned to Headworks, Inc. of Houston, Tex., and hereby incorporated in their entirety herein. It should be noted that while the screens 28 is illustrated in FIG. 1, such screening may in general be known by different names, such as, for example, equipment available from the Headworks, Inc., under the commercial designations Mahr® bar screens, Eliminator™ band, Perforator® screens, X-tractor™, Spiralman™, Black Box™, and so forth. In general, such systems receive wastewater (e.g., the wastewater 12) and remove large debris and solid particles from the wastewater, performing a coarse screening operation. The screens 28 may remove larger solids in the wastewater such that the screened wastewater has solids having a particle size of between approximately 1 millimeter (mm) and approximately 4 mm, for example. The resulting trash or sludge formed by the removed contaminants is carried away, such as by a screw auger for disposal, as illustrated by arrow 30.

In certain embodiments, wastewater from the initial screening section 24 may flow directly into the fine filtering section 26 to remove additional solids (e.g., solids not removed in the initial screening section 24). Such fine filtering may be performed by mechanical means, such as cylinder-type systems or through any other type of filtering system. More generally, such fine filtering may be performed by drum screens, microfilters, and so forth, available from a range of sources. Such systems may operate by circulating a mat or belt of a woven or non-woven material through wastewater flowing downstream of the initial screening filter (e.g., the screen filter 28). The mat collects very fine particulate matter (e.g., particulate matter having an average particle size of between approximately 500 microns (μm) and approximately 6 millimeters (mm)) and suspended solids, allowing wastewater with smaller entrained solids (e.g., solids having an average particles size less than 100 microns (μm)) to flow through the filter. The solids and particulate matter collected by the mat may then be removed, such as by impacting the mat with a stream of air and/or water, to form a sludge that is carried away for disposal, as illustrated by arrow 36. Such filtration may be carried on to a level of particulate solids in the wastewater as fine as between approximately 50 microns (μm) and approximately 100 μm. Moreover, as with the initial screening section 24, the fine filtering section 26 may be designed to increase or slow the speed of screens and belts based upon a differential pressure across the screens and belts, thereby maintaining a relatively constant pressure differential forcing flow through the device.

Wastewater 40 from the primary mechanical treatment (e.g., in the primary treatment section 16) flows to the secondary treatment section 18. For example, a pump 41 or other flow adjusting device may facilitate a flow of the wastewater 40 to the secondary treatment section 18. In certain embodiments, the wastewater 40 may be pre-heated (e.g., via a heat exchanger) upstream of the secondary treatment section 18 (e.g., in the primary treatments section 16, wastewater storage tank, and/or in a conduit coupling the sections 16 and 18). In the illustrated embodiment, the secondary treatment section 18 includes one or more bio-media reactors 42, 46. The reactors 42, 46 further treat the wastewater 40 by with different types of bacteria. These bacteria may be grown in a suspended phase or attached phase. In certain embodiments, the bacteria may be supported on molded plastic (e.g., bio-carriers) or other media. In the presently contemplated embodiment, for example, the reactors 42, 46 are moving bed biofilm reactors (MBBR) that have freely circulating support media suspended within the wastewater 40. The support media includes bacterial growths that aid in removal of contaminants from the wastewater 40. In certain embodiments, the system 10 may include redundant bio-media reactors 42, 46, both increasing the normal throughput of the system 10 and providing for continued operation in the event of operational problems or servicing of either one of the reactors 42, 46. In certain applications as few as a single reactor 42, 46 may be provided, or more than two reactors 42, 46 could be provided where desired. As discussed above, in a presently contemplated embodiment, the bio-media reactors 42, 46 may be configured to operate under both aerobic and anaerobic conditions, as discussed in further detail below with reference to FIGS. 2-15.

From the bio-media reactors 42, 46, a first bio-treated wastewater 50 generated in the bio-media reactors 42, 46 flows to a dissolved air flotation system 52. The dissolved air flotation system 52 may remove additional wastewater contaminants (e.g., solids, oil, etc.), thereby generating a second bio-treated wastewater 54. In certain applications, however, the dissolved air flotation system 52 may be replaced with a clarifier or other filter to complete the secondary treatment process. In a presently contemplated embodiment, the dissolved air flotation system 52 may be of a type available commercially from Headworks Bio Inc., of Houston, Tex.

Once the secondary treatment is completed, the second bio-treated wastewater 54 may flow to the tertiary treatment section 20, where provided. In the illustrated embodiment, the tertiary treatment section 20 may include effluent polishing 56. The effluent polishing 56 may further treat the second bio-treated wastewater 54 to generate the treated wastewater 14, which is suitable for discharge to the environment (e.g., sea, river, lake, wet lands, ground, etc.). As will be appreciated by those skilled in the art, such polishing may be accomplished in various means, typically by fine filtration, such as by percolation through sand or other media.

Figure 2:
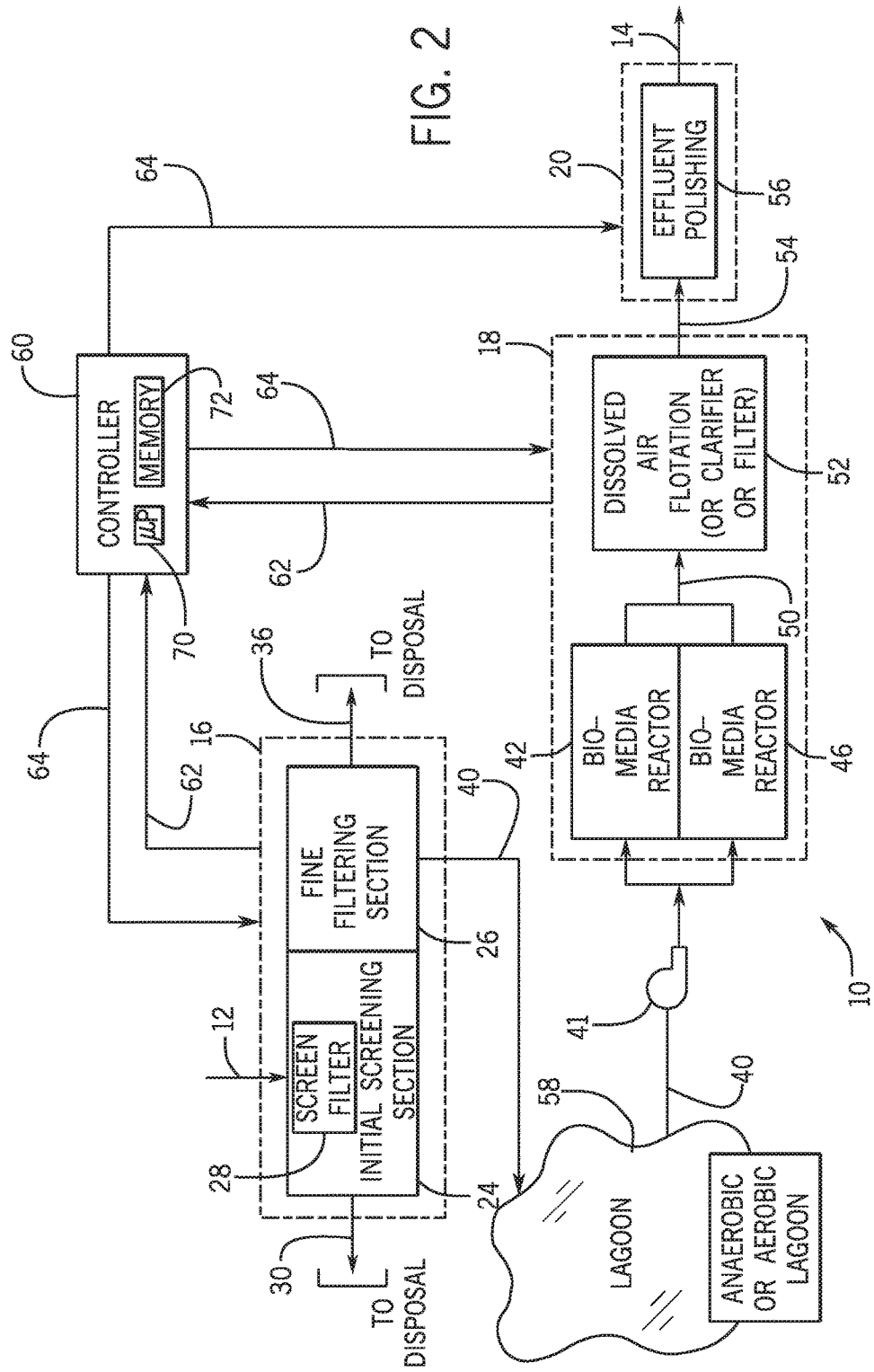
FIG. 2 is diagrammatical overview of an embodiment of the wastewater treatment system of FIG. 1 including an equalization tank between the primary treatment section and the secondary treatment section.

In certain embodiments, the primary treatment section 16 may be coupled to an equalization tank 58 (e.g., a retention pond, a storage lagoon). For example, as illustrated in FIG. 2, the primary treatment section 16 may feed filtered wastewater 40 into the equalization tank 58, rather than the secondary treatment section 18. The equalization tank 58 may store the filtered wastewater 40 until further use. In this way, equipment (e.g., storage tanks) generally used to store the wastewater 40 upstream of the secondary treatment section 18 may be omitted or their size minimized. Therefore, because the system 10 has reduced system components, the system 10 may occupy a smaller space compared to systems that do not include the equalization tank 58. This may be advantageous in geographical areas that have limited real estate space for installation of a wastewater treatment system, such as the system 10. Additionally, the equalization tank 58 may equalize a flow and load of the filtered wastewater 40. In certain embodiments, a pH of the filtered wastewater 40 may be adjusted in the equalization tank to block biological upsets due to pH variations of the filtered wastewater 40. The equalization tank 58 may supply the secondary treatment section 18 (e.g., the reactor 42, 46) with the filtered wastewater 40 via the pump 41 or other fluid delivery device.

Returning to FIG. 1, the system 10 also includes a controller 60 (e.g., an electronic and/or processor-based controller) to govern operation of the system 10. The controller 60 may be configured to control in batch mode and/or continuous mode operations of the system 10. The controller 60 may control operation of the system 10 by communicating via wired conduits or wirelessly with sensors (e.g., temperature sensors, flow sensors, conductivity sensors, pressure sensors, etc.), control valves, and pumps, or other flow adjusting features or actuators disposed throughout the system 10. For example, the controller 60 may receive and input signal 62 from the sections 16, 18, and/or 20 with information associated with the operational condition/parameters of the system 10 (e.g., a fluid flow rate, fluid mixing rate, fluid retention times, temperature, pressure, etc.) and/or chemical and physical properties of the wastewater streams (e.g., total organic content (TOC), conductivity, viscosity, particle loading, particle size, etc.). In certain embodiments, the input signal 62 may be manually entered by an operator of the system 10. For example, the operator may input the operational settings for the system 10 (e.g., flow rates, mixing rates, temperature, pressure, etc.), a composition of the wastewater (e.g., TOC, solid particle loading), a volume of the wastewater (e.g., the wastewater 40) in the reactors 42, 46, or any other desirable information to facilitate operation of the system 10. The controller 60 transmits an output signal 64 to control the system 10 (e.g., flow adjusting features within the sections 16, 18, and/or 20, temperature, pressure, etc.) based on information received from the sensors associated with the flow adjusting features and/or the operator of the system 10.

As discussed above, the reactor 42, 46 includes biological media (e.g., bio-carriers) that facilitate anaerobic and/or aerobic treatment of the wastewater 40. A mixing rate of the biological media and wastewater may affect a reduction rate of the BOD in the wastewater 40. For example, if the media is not evenly dispersed within the wastewater 40 or if there is insufficient aeration of the wastewater, the efficiency of reactor 42, 46 may decrease. Therefore, by mixing the biological media and wastewater 40 such that the biological media is evenly dispersed throughout the wastewater 40 and a desirable amount of aeration is achieved, the efficiency of the reactor 42, 46 may be increased. The controller 60 may adjust the mixing rate of the biological media and the wastewater 40 mixture within the reactor 42, 46 to increase efficiency of the reactor 42, 46 based on a viscosity of the wastewater (e.g., the wastewater 40), the TOC of the wastewater, or any other suitable characteristic of the wastewater 40 and/or biological media used in the reactor 42, 46.

During operation of the reactor 42, 46, biogas (e.g., a gas mixture including methane ($CH_4$)) may be generated from the anaerobic MBBR reactor due to digestion of the organic matter within the wastewater 40. The controller 60 may monitor a pressure of the reactor 42, 46 and determine an amount of the biogas generated during digestion based on the pressure of the reactor 42, 46. In certain embodiments, the controller 60 may control operation of the system 10 based on the pressure within the reactor 42, 46. For example, if the pressure within the reactor 42, 46 is above a desired threshold value, the controller 60 may increase a flow rate of the biogas exiting the reactor 42, 46 and/or lower a temperature of the reactor 42, 46 or the wastewater 40 entering the reactor 42, 46. Decreasing the temperature of the reactor 42, 46 may also decrease a digestion rate of the organic matter, thereby decreasing the amount of biogas generated and the pressure within the reactor 42, 46 over time.

In certain embodiments, the controller 60 may indicate (e.g., via an alarm, light, icon, audio, etc.) an operational status of the system 10 to the operator. For example, the reactor 42, 46 may include sensors that provide fluid level information within the reactors 42, 46 or other system components to the controller 60. The controller 60 may indicate to the operator that the bio-reactors 42, 46 have reached a desired fluid level of bio-media and/or wastewater 40 or are below a desired fluid level. Based on the fluid levels within the bio-reactors 42, 46, the controller 60 may adjust flow devices (e.g., the pump 41, flow valves, etc.) to increase, decrease, and/or block a flow of fluids entering the reactors 42, 46. The controller 60 may also indicate to an operator that the system 10 is due for maintenance. For example, the secondary treatment section 18 may include sensors downstream of the reactor 42, 46 that detect a quality (e.g., solid content, organic loading, contaminants, etc.) of the bio-treated wastewater 50, 54. Based on the quality of the bio-treated wastewater 50, 54, the controller 60 may indicate to the operator that the system 10 is properly operating or is due for maintenance. In certain embodiments, if the quality of the bio-treated wastewater 50, 54 is below a desired level, the controller 60 may redirect the bio-treated wastewater 50, 54 back to the reactor 42, 46 and/or the dissolved air flotation system 52 for additional treatment.

The controller 60 may include a distributed control system (DCS), system control and data acquisition (SCADA), human machine interface (HMI), batch control, or any computer-based system that is fully or partially automated. For example, the controller 60 can be any device employing a general purpose or an application-specific processor 70, both of which may generally include memory circuitry 72 for storing instructions executable by the processor 70. Data stored on the memory circuitry 72 may include, but is not limited to, wastewater, biogas, and sludge fluid levels, flow rates, pressure, temperature, threshold values, pH, dissolved oxygen (DO), chemical oxygen demand (COD), TOC, oxidation-reduction potential (ORP), e.g., associated with contaminant concentration levels, organic loading, pressure, temperature, etc., and any other desirable information to facilitate operation of the system components. The processor 70 may include one or more processing devices, and the memory circuitry 72 may include one or more tangible, non-transitory, machine-readable media collectively storing instructions executable by the processor 70 to perform the acts of FIG. 15, as discussed below, and control actions described herein.

Figure 3:
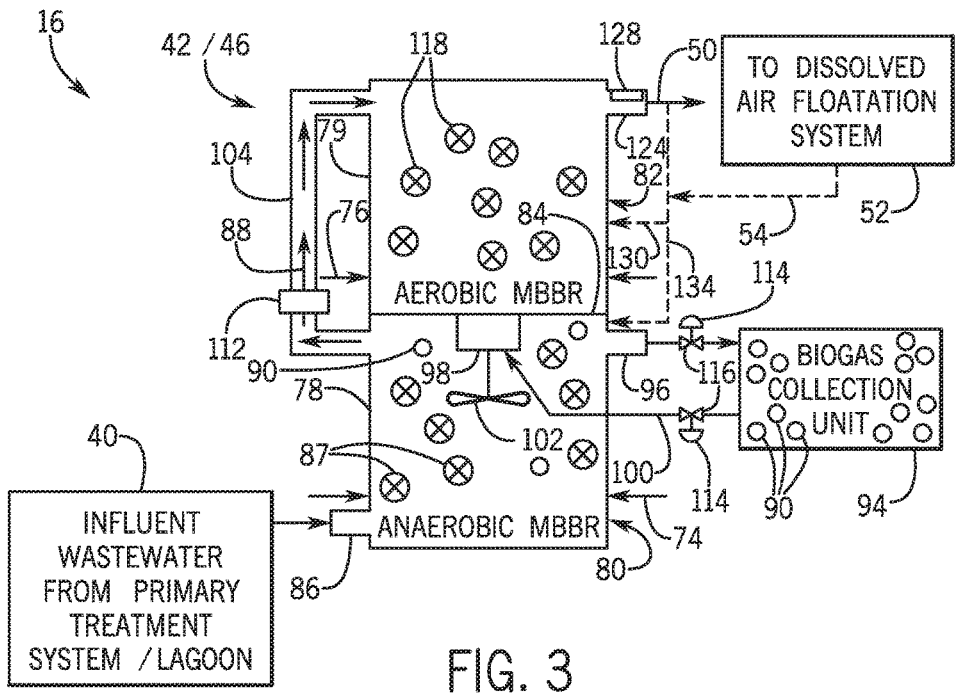
FIG. 3 is a diagrammatical view of an embodiment of a portion of the secondary treatment section of FIGS. 1 and 2, the secondary treatment section includes a stacked bio-reactor having an anaerobic moving bed biofilm reactor (MBBR) below an aerobic MBBR.
Figure 4:
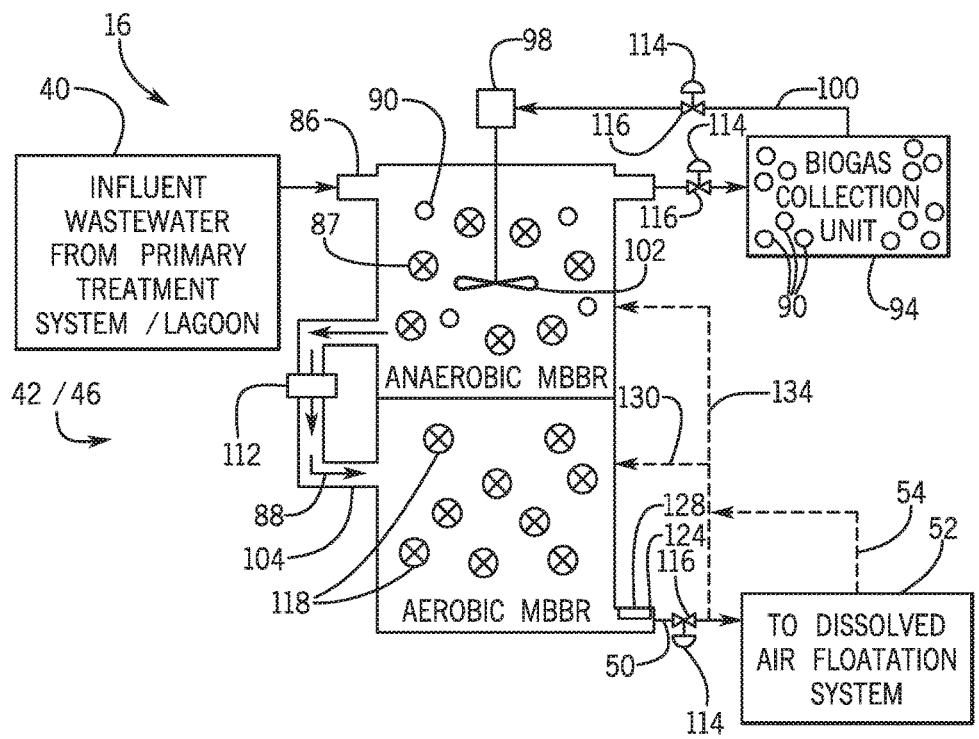
FIG. 4 is a diagrammatical view of an embodiment of a portion of the secondary treatment section of FIGS. 1 and 2, the secondary treatment section includes a stacked bio-reactor having the anaerobic MBBR above the aerobic MBBR.

As discussed above, the reactor 42, 46 in the secondary treatment section 18 is configured to operate under anaerobic conditions, with oxidation reduction potentials (ORP) below approximately −350 millivolts (mV), and aerobic conditions, with oxidation reduction potentials (ORP) larger than approximately +50 mV (e.g., between approximately +50 mV and approximately +200 mV, respectively. For example, FIG. 3 illustrates an embodiment of the secondary treatment section 18 including the reactor 42, 46 having an anaerobic moving bed biofilm reactor (MBBR) 80 and an aerobic MBBR 82 downstream of the anaerobic MBBR 80. While in the illustrated embodiment the anaerobic MBBR 80 is below the aerobic MBBR 82, it should be appreciated that other reactor 42, 46 configurations are also within the scope of the present disclosure. For example, as illustrated in FIG. 4, the anaerobic MBBR 80 is positioned above the aerobic MBBR 82. A first outer diameter 74 of the anaerobic MBBR 80 is approximately equal to a second outer diameter 76 of the aerobic MBBR 82 such that a first reactor outer wall 78 is aligned with a second reactor outer wall 79. 82 may be aligned with a centerline axis 83 of the reactor 42, 46. However, in other embodiments, the outer diameters 74, 76 may be different. For example, the first outer diameter 74 may be larger or smaller than the second outer diameter 76.

Figure 5:
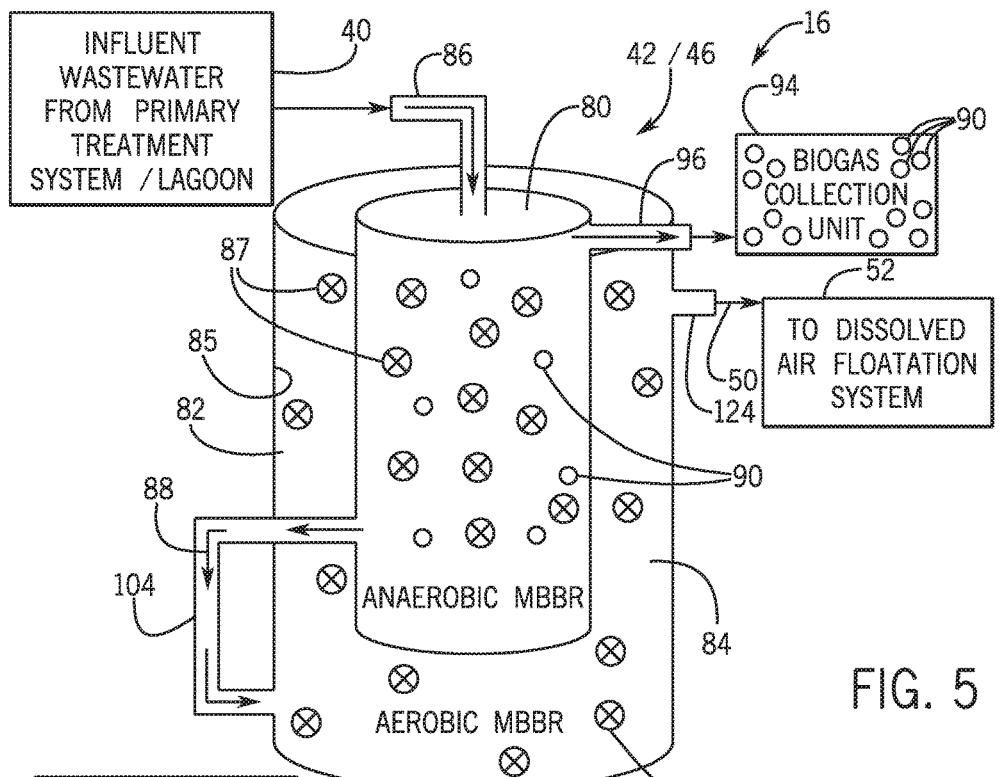
FIG. 5 is a diagrammatical view of an embodiment of a portion of the secondary treatment section of FIGS. 1 and 2, the secondary treatment section includes a bio-reactor having the anaerobic MBBR surrounded by the aerobic MBBR.
Figure 6:
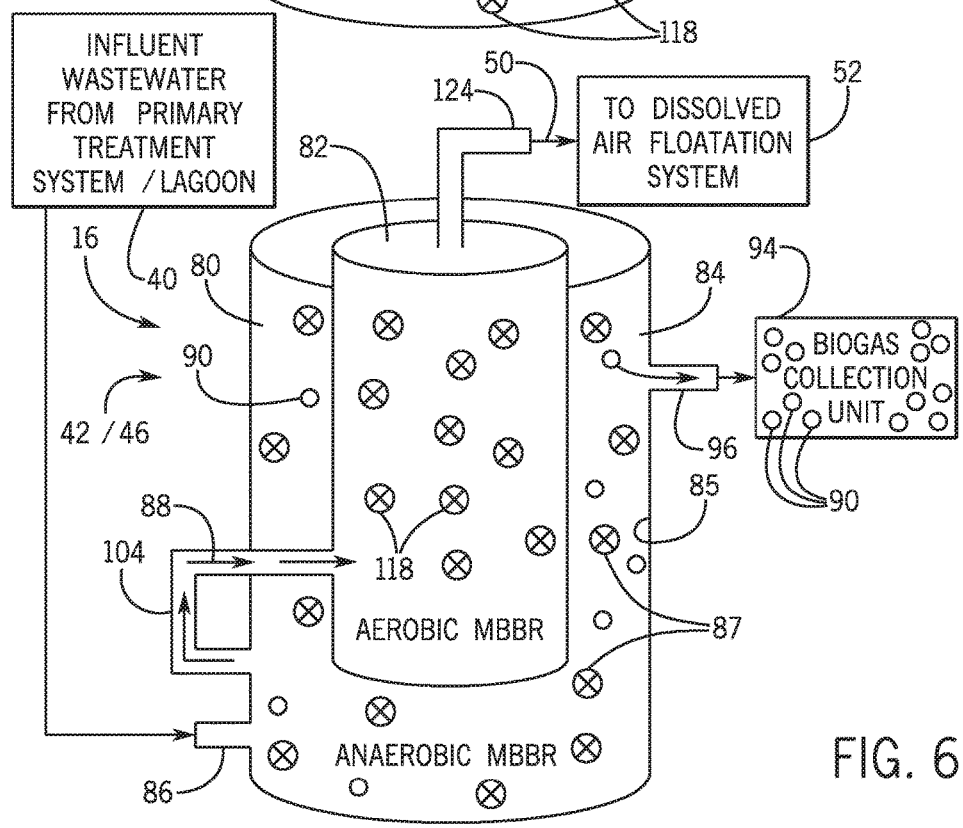
FIG. 6 is a diagrammatical view of an embodiment of a portion of the secondary treatment section of FIGS. 1 and 2, the secondary treatment section includes a bio-reactor having the aerobic MBBR surrounded by the anaerobic MBBR.

In one embodiment, the MBBR 80, 82 are within a single reactor 42, 46 (e.g., integrated). In other embodiments, the MBBR 80, 82 may be within separate reactors 42, 46 (e.g., non-integrated). As should be noted, the MBBR 80, 82 may be positioned side-by-side (e.g. along a horizontal axis), rather than stacked one on top of the other (e.g., along a vertical/longitudinal axis). In other embodiments, one MBBR 80, 82 is disposed within the other MBBR 80, 82, as illustrated in FIGS. 5 and 6. For example, as illustrated in FIG. 5, the anaerobic MBBR 80 is disposed within the aerobic MBBR 82 such that at least a portion of the anaerobic MBBR 80 is surrounded (e.g., encircled) by the aerobic MBBR 82. That is, the aerobic MBBR 82 occupies an annular space 84 between a reactor inner wall 85 of the reactor 42, 46 and an anaerobic reactor outer wall 87. Similarly, in FIG. 6, the aerobic MBBR 82 is disposed within the anaerobic MBBR 80 such that the anaerobic MBBR occupies the annular space 84. As should be noted, certain features illustrated in FIGS. 2 and 3 have been omitted from FIGS. 5 and 6 to facilitate discussion. It should also be noted that, in certain embodiments, the MBBR 80 may only be partially disposed inside the MBBR 82, or vice versa, for example, to enable access at different levels or heights.

Incorporating the anaerobic MBBR 80 into the reactor 42, 46, may enable the secondary treatment section 18 to treat high strength wastewaters (e.g., wastewaters having an organic loading of between approximately 0.1 kilograms chemical oxygen demand/cubic meters (kg COD/$m^3$) and approximately 40 kg COD/$m^3$. The secondary treatment section 18 is configured to reduce the total organic carbon (e.g., TOC) of the wastewater 12 to meet environmental standards. In addition, because the secondary treatment system is configured to handle high strength wastewaters, an amount of biogas generated in the reactor 42, 46 may be increased. The increase in biogas production may facilitate the use of recovered energy (e.g., the biogas) to operate the various components of the system 10.

The wastewater 40, which includes approximately 40 kg $COD/m^3$ or less, is supplied to the reactor 42, 46 via an inlet 86 fluidly coupled to the anaerobic MBBR 80. The anaerobic MBBR 80 includes first bio-carriers 87 that include bacterial growths (e.g., mixture of heterotrophic and autotrophic bacteria) that digest the organic matter within the wastewater 40, thereby decreasing the TOC of the wastewater 40 and generating anaerobically treated wastewater 88 and biogas 90. For example, the first bio-carriers 87 may include plastic carriers having active cell media (e.g., heterotrophic bacteria) disposed on one or more surfaces. During treatment of the wastewater 40, the active cell media digest the organic matter and use the carbon in the organic matter to proliferate (e.g. grow) on the one or more surfaces, thereby enabling digestion of the organic matter in the wastewater 40 and increasing the digestion efficiency of the reactor 42, 46.

In certain embodiments, the wastewater 40 may be supplemented with nutrients (e.g. by addition of nitrogen or phosphorus) before, during, or after entering the anaerobic MBBR 80 to facilitate production of the anaerobically treated wastewater 88. If the wastewater has insufficient amount of nutrients, the growth of the bacteria will be affected, thereby affecting treatment efficiency. The nutrients may enhance (e.g., increase) the treatment efficiency of the anaerobic section 80, thereby decreasing a residence time of the wastewater 40 within the anaerobic section 80. In addition, as discussed above, the wastewater 40 may be heated prior to flowing into the anaerobic section 80 (e.g., via a heat exchanger).

The biogas 90 generated in the anaerobic section 80 may be recovered in a biogas collection unit 94 coupled to the anaerobic section 80. For example, the biogas 90 generated in the anaerobic section 80 may exit the reactor 42, 46 via a first outlet 96, and flow into the biogas collection unit 94. The biogas collection unit 94 may store the biogas 90 until further use. In certain embodiments, the biogas 90 may be used as an energy source to operate at least a portion of the system 10 components. For example, the biogas collection unit 94 may direct at least a portion of the biogas 90 to a power generation device 98 (e.g., gas engine), as illustrated by arrow 100. In the illustrated embodiments, the power generation device 98 provides power to a mixer 102 disposed within the anaerobic MBBR 80, which is used for mixing and/or agitating the wastewater 40 and the bio-carriers 87. However, the power generation device 98 may provide power to other components of the system 10, such as the reactor 42, 26, flow devices, and/or other system components, including electric generators. Recovering and using the biogas 90 to provide energy to the system 10 may decrease the overall carbon footprint of the system 10 compared to wastewater treatment systems that are not configured to recover and circulate the biogas 90 to power generating devices (e.g., the power generation device 98).

Following anaerobic treatment of the wastewater 40, the anaerobic MBBR 80 directs the anaerobically treated wastewater to the aerobic MBBR 82 via a first conduit 104. Similar to the anaerobic MBBR 80, the aerobic MBBR 82 is configured to degrade (e.g., breakdown) the organic material in the wastewater 88. In certain embodiments, a flow device 112 (e.g., a pump, flow valve, etc.) may be used to facilitate a flow of the wastewater 88 to the aerobic MBBR 82. In other embodiments, a pressure differential between the anaerobic and the aerobic MBBR 80, 82, respectively, may be used to facilitate a flow of the wastewater 88 from the anaerobic MBBR 80 to the aerobic MBBR 82. The controller 60 may signal (e.g., output signal 64) the flow device 112 to block a flow of fluids (e.g., the wastewater 40, 88) from entering or exiting the anaerobic MBBR during anaerobic digestion. Once anaerobic digestion is complete, the controller 60 may signal the flow device 112 to allow a flow of the wastewater 88 out of the anaerobic MBBR 80 (e.g., via the first conduit 104). In certain embodiments the controller 60 may send a signal to an actuator 114 to open or close a valve 116 to allow or block a flow of the biogas 90 to the biogas collection unit 94 and/or the power generating device 98.

While in the aerobic MBBR 80, organic material in the anaerobically treated wastewater 88 may be degraded. As such, the TOC in the treated wastewater (e.g., the bio-treated wastewater 50, 54) may be further decreased compared to the TOC in the anaerobic treated wastewater 88. The aerobic MBBR 82 may degrade approximately 98% of the remaining TOC in the anaerobic treated wastewater 88 to generate the first bio-treated wastewater 50.

As discussed above, the aerobic MBBR 82 degrades (e.g., breaks down) any remaining organic matter in the wastewater 88. Accordingly, the aerobic MBBR 82 includes second bio-carriers 118 having bacteria (e.g., heterotrophic bacteria) that digest the organic material in under aerobic conditions (e.g., in the presence of oxygen (O2). Similar to the first bio-carriers 87, the second bio-carriers 118 are plastic carriers having active cell media (e.g., the heterotrophic bacteria) disposed on a bio-carrier surface. Due, in part, to a decreased TOC in the wastewater 88 compared to the wastewater 40, a retention time of the wastewater 88 in the aerobic MBBR 82 may be less than the retention time of the filtered wastewater 40 in the anaerobic MBBR 80. However, in other embodiments, the retention times of the wastewater 40, 88 in the respective MBBR 80, 82 are the same. The aerobic MBBR 82 includes an air inlet (not shown) that allows a flow of air into the aerobic MBBR 82. The air aerates the wastewater 88 and disperses the bio-carriers 118 within the aerobic reactor MBBR 82 to facilitate digestion of the organic matter and generate the first treated wastewater 50 (e.g., aerobic treated wastewater). Following treatment of the wastewater 88 in the aerobic MBBR 82, the controller 60 may signal a flow device (e.g., a pump or valve) to direct a flow of the first bio-treated wastewater 50 to the dissolved air flotation system 52 via a second outlet 124 for further processing.

In certain embodiments, a sensor 128 (e.g., a TOC sensor, resistivity sensor, or any other suitable sensor) may be disposed within or downstream of the reactor 42, 46 (e.g., in the aerobic MBBR 82, between the reactor 42, 46 and the system 52, and/or downstream of the system 52). The sensor 128 may measure TOC, conductivity, or any other suitable parameter of the bio-treated wastewater 50, 54. The controller 60 may receive information from the sensor 128 (e.g. via input signal 62) and determine the quality of the bio-treated wastewater 50, 54. The controller 60 may compare the measured quality of the bio-treated wastewater 50, 54 with a wastewater quality threshold value stored in the memory 72. For example, the wastewater quality threshold value may include environmental standard levels such as TOC, suspended particle, nitrogen and phosphorus levels, etc. for wastewaters suitable for discharge to the environment. Based on a relationship between the measured quality and the threshold value, the controller 60 may signal the system 10 to recirculate the bio-treated wastewater 50, 54 to the reactor 42, 46 or direct the wastewater 50, 54 to the dissolved air flotation system 52 and/or the tertiary treatment section, when included. For example, if the controller 60 determines that the TOC, particle loading, contaminant level, or other wastewater quality parameter is above the threshold value, the controller 60 may signal the system 10 to recirculate the bio-treated wastewater 50, 54 to the reactor 42, 46. The bio-treated wastewater 50, 54 may be recirculated to the anaerobic MBBR 80, the aerobic MBBR 82, or a combination thereof, as illustrated by arrows 130, 134. As such, the bio-treated wastewater 50, 54 may undergo additional digestion to reduce the quality parameter to levels that are at or below a desired threshold value.

The reactor 42, 46 may also include a buffer reactor having an oxidation reduction potential in the range of approximately −100 mV to approximately +50 mV (e.g., an anoxic reactor). For example, as illustrated in FIGS. 7-11, the reactor 42, 46 includes a buffer reactor 132 disposed between the anaerobic MBBR 80 and the aerobic MBBR 82. The buffer reactor 132 may be used for de-nitrification of the treated wastewater (e.g., treated wastewater 88, 50) and/or to decrease the load to the aerobic MBBR. In general, the wastewater 12, 40 includes nitrogen (N) in the form of ammonia ($NH_3$). In addition, anaerobic digestion of the wastewater 40 may also generate ammonia. The buffer reactor 132 may reduce (e.g., de-nitrification) the nitrate to nitrogen gas ($N_2$). The nitrogen gas may vent off the wastewater 88, 50, thereby reducing an amount of nitrogen in the bio-treated wastewater 50, 54 to levels suitable for environmental wastewater discharge. In addition, by positioning the buffer reactor 132 between the anaerobic MBBR 80 and the aerobic MBBR 82, the buffer reactor 132 may buffer (e.g., condition) the wastewater 88 before aerobic digestion in the aerobic MBBR 82.

In operation, the anaerobic MBBR 80 directs the wastewater 88 into the buffer reactor 132 via a second conduit 140. The buffer reactor 132 receives oxidized forms of nitrogen from the aerobic MBBR 82 through conduit 152 and will reduce or denitrify the oxidized forms of nitrogen to further reduce TOC load flowing to MBBR 82 by conduit 150. As should be noted, the second conduit 140 may include valves, pumps, or any other suitable flow device (e.g., the flow device 112, valve 114) to control a flow of the wastewater 88 from the anaerobic MBBR 80 to the buffer reactor 132. The buffer reactor 132 denitrifies the wastewater 88 to generate a third bio-treated wastewater 146. In certain embodiments, the buffer reactor 132 may be a moving bed biofilm reactor (MBBR), and includes third bio-carriers 136 to facilitate digestion of at least a portion of the organic matter remaining in the wastewater 88. The bio-carriers 136 include, for example, active cell media (e.g., heterotrophic bacteria) that are suitable for de-nitrification of the wastewater 88 under anoxic conditions. In other embodiments, the buffer reactor 132 is a fixed bed bio-reactor.

After de-nitrification of the wastewater 88, the buffer reactor 132 directs the third bio-treated wastewater 146 to the aerobic MBBR 82 via a third conduit 150. While in the aerobic MBBR 82, the third bio-treated wastewater 146 undergoes aerobic digestion, thereby generating the bio-treated wastewater 50. In certain embodiments, the aerobic MBBR 82 directs a portion 152 of the second bio-treated wastewater 50 to the buffer reactor 132 via a fourth conduit 156. The buffer reactor 132 serves the role of denitrification of wastewater that has been nitrified or oxidized in the aerobic MBBR 82. For example, the buffer reactor 132 reduces TOC load remaining in the wastewater 88 (e.g., effluent from the anaerobic MBBR 80) by utilizing the oxygen contained in nitrates recycled from aerobic MBBR 82. The reduction of nitrates in the buffer reactor 132 will also restore alkalinity and lower the consumption of alkali where needed for certain industrial wastewaters. Alkalinity may be destroyed in the aerobic MBBR 82 when nitrification occurs and may need to be increased for the treatment process to run at the highest efficiency.

Figure 7:
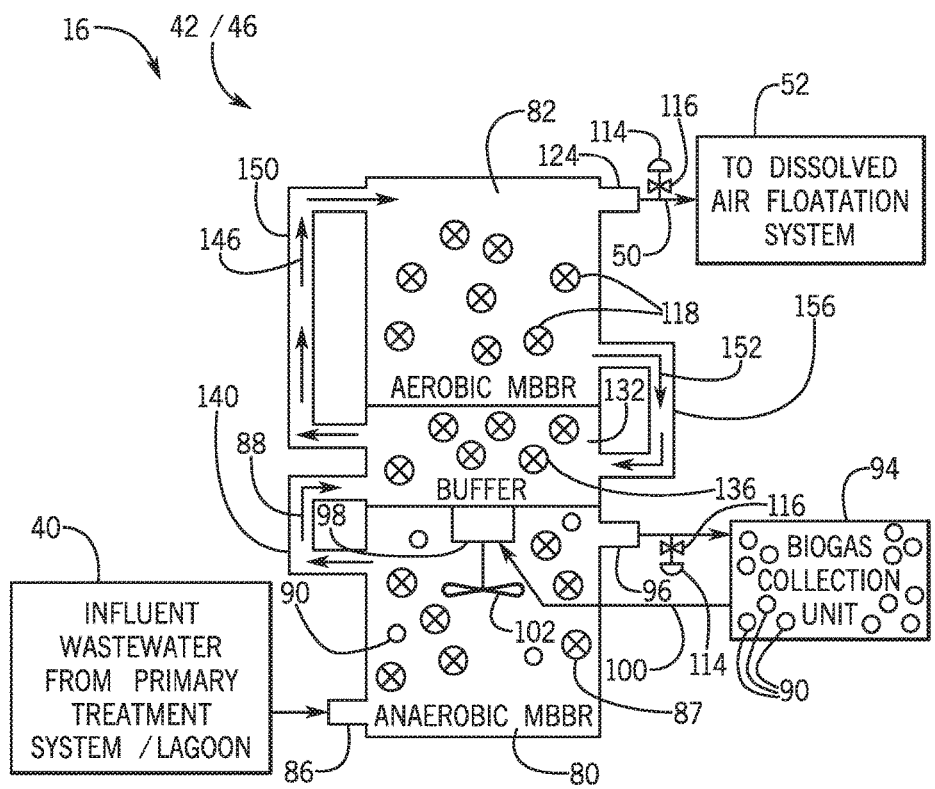
FIG. 7 is a diagrammatical view of an embodiment of a portion of the secondary treatment section of FIGS. 1 and 2, the secondary treatment section includes the stacked bio-reactor of FIG. 3 having a buffer reactor above the anaerobic MBBR and below the aerobic MBBR.
Figure 8:
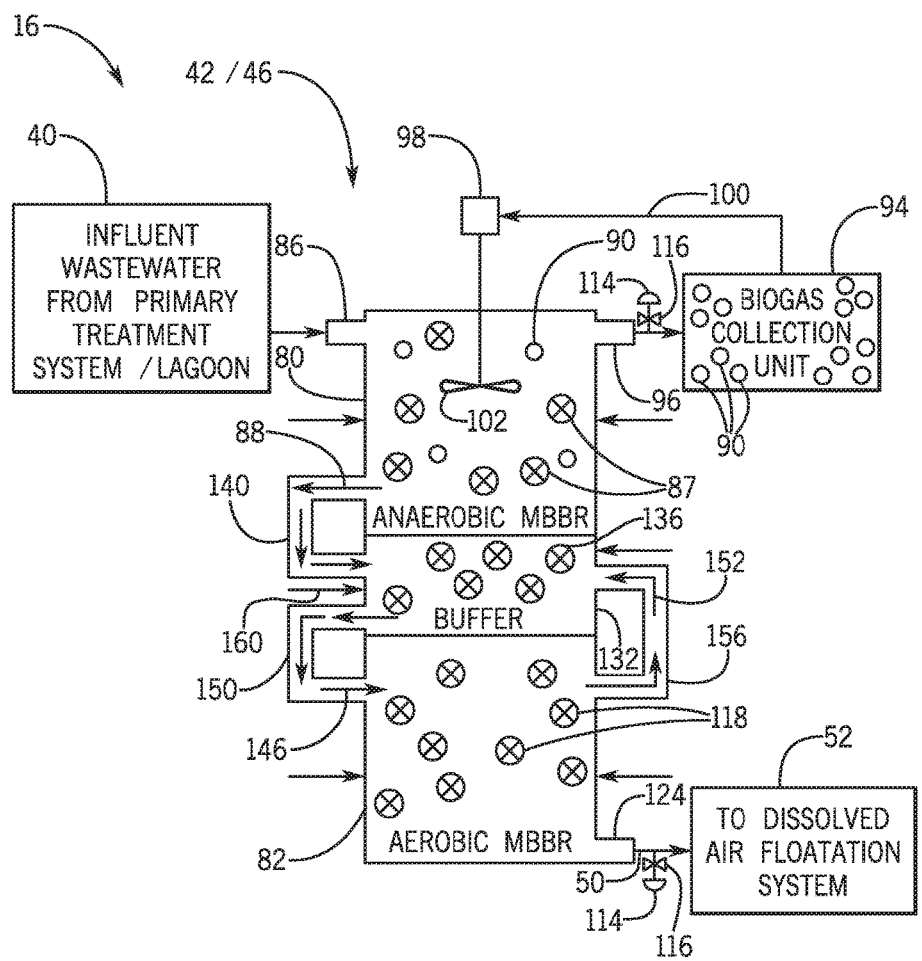
FIG. 8 is a diagrammatical view of an embodiment of a portion of the secondary treatment section of FIGS. 1 and 2, the secondary treatment section includes the stacked bio-reactor of FIG. 4 having a buffer reactor below the anaerobic MBBR and above the aerobic MBBR.

In the embodiment illustrated in FIG. 7, the buffer reactor 132 is disposed above the anaerobic MBBR 80 and below the aerobic MBBR 82. However, in certain embodiments, the buffer reactor 132 is disposed below the anaerobic MBBR 80 and above the aerobic MBBR 82, as illustrated in FIG. 8. In the embodiments illustrated in FIGS. 7 and 8, the buffer reactor 132 has a third outer diameter 160 approximately equal to the outer diameters 74, 76 of the MBBR 80, 82, respectively. However, in certain embodiments, the outer diameter 160 may be less than or greater than the outer diameters 74, 76. The buffer reactor 132 may occupy a volume of between approximately 5% and approximately 50% of the reactor 42, 46. For example, the buffer reactor 132 may be 5%, 10%, 15%, 20%, 25%, 30%, 40%, or 50% of the total volume of the reactor 42, 46.

Figure 9:
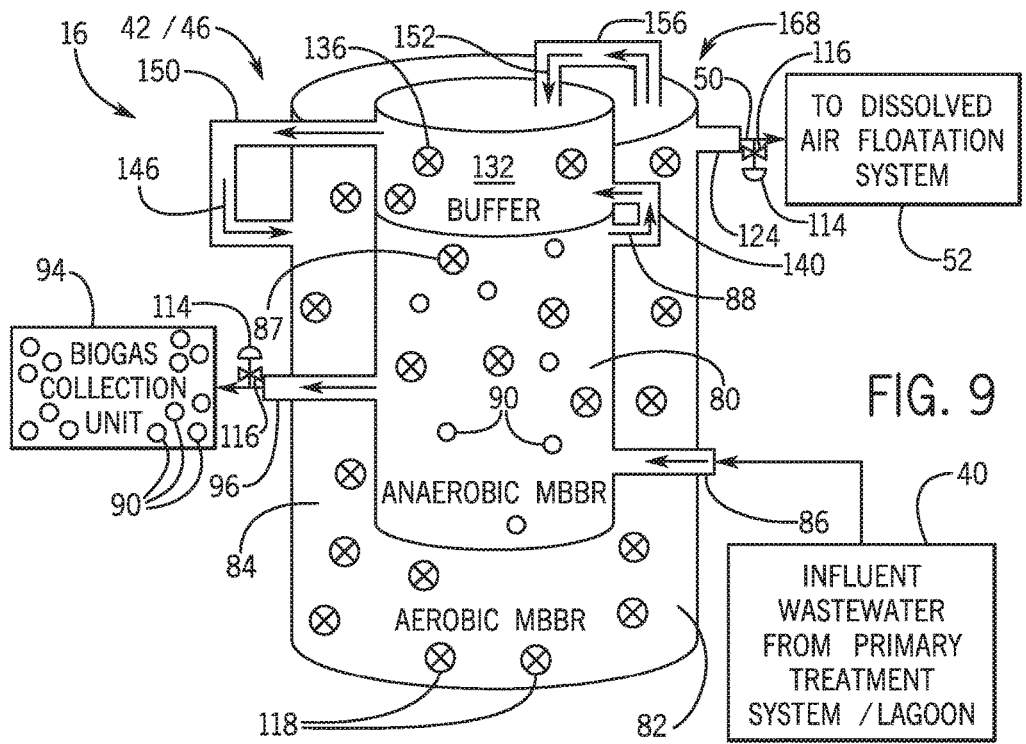
FIG. 9 is a diagrammatical view of an embodiment of portion of the secondary treatment section of FIGS. 1 and 2, the secondary treatment section includes the bio-reactor of FIG. 5 having a buffer reactor disposed within the anaerobic MBBR.
Figure 10:
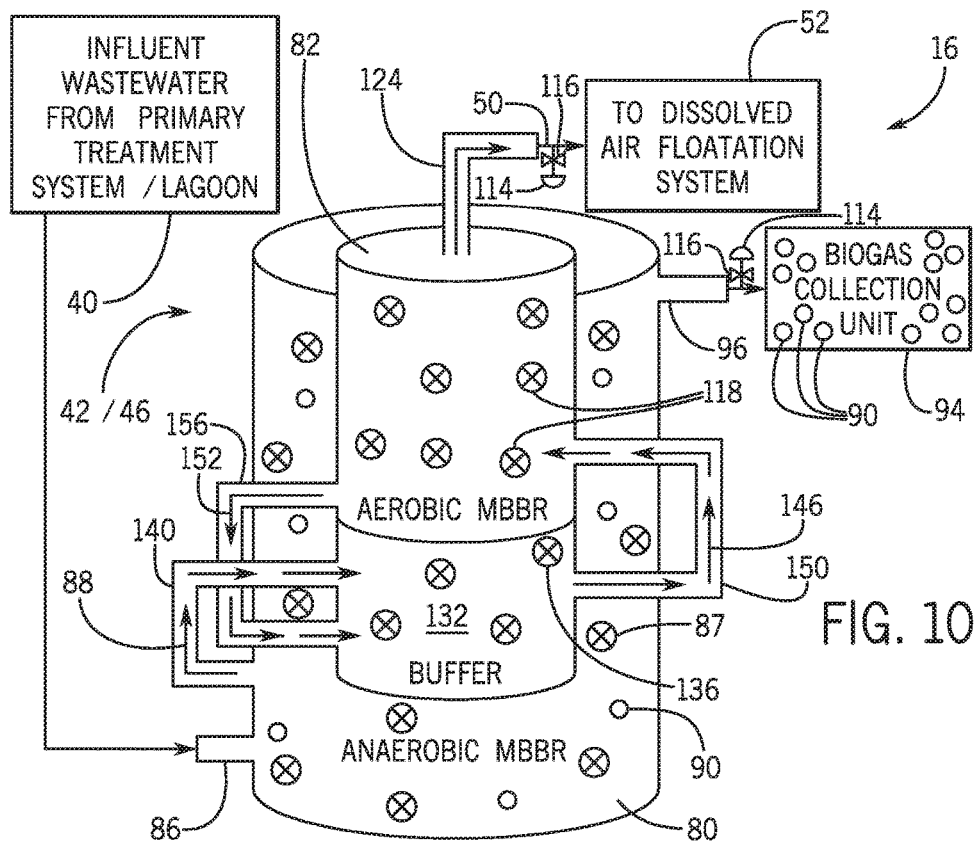
FIG. 10 is a diagrammatical view of an embodiment of a portion of the secondary treatment section of FIGS. 1 and 2, the secondary treatment section includes the bio-reactor of FIG. 6 having the buffer reactor disposed within the aerobic MBBR.

In embodiments where the MBBR 80, 82 is disposed within the other MBBR 80, 82, the buffer reactor 132 may be integrated with the anaerobic MBBR 80, the aerobic MBBR 82, or a combination thereof. For example, as illustrated in FIG. 9, the buffer reactor 132 is integrated with the anaerobic MBBR 80. The buffer reactor 132 is disposed at an upper portion 168 of the reactor 42, 46 such that the third bio-treated wastewater 146 enters the aerobic MBBR 80 at the top end 168. In this particular embodiment, the anaerobic MBBR 80 and the buffer reactor 132 are surrounded (e.g., encircled) by the aerobic MBBR 82. Alternatively, the buffer reactor 132 may be integrated with the aerobic MBBR 82 such that at least a first portion of the anaerobic MBBR 80 is surrounded by the buffer reactor 132 and at least a second portion of the anaerobic MBBR 80 is surrounded by the aerobic MBBR 82. That is, both the aerobic MBBR 82 and the buffer reactor 132 are within the annulus 84 of the reactor 42, 46. The buffer reactor 132 may occupy a volume of between approximately 5% and approximately 50% of the total volume of the MBBR 80, 82. Similarly, as illustrated in FIG. 10, the anaerobic MBBR 80 may be disposed within the annulus 84, thereby surrounding at least a portion of the aerobic MBBR 82 and the buffer reactor 132.

Figure 11:
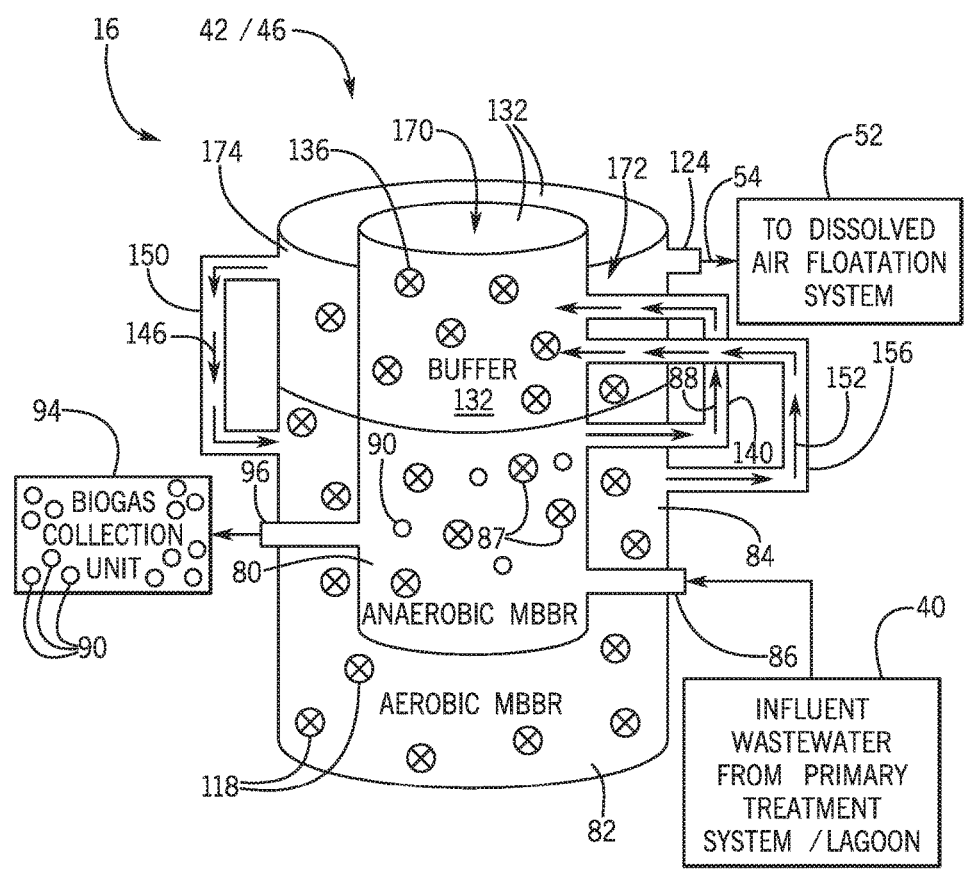
FIG. 11 is a diagrammatical view of an embodiment of a portion of the secondary treatment section of FIGS. 1 and 2, the secondary treatment section includes the bio-reactor of FIG. 6 having a first portion of a buffer reactor disposed within the anaerobic MBBR and a second portion of the buffer reactor disposed within the aerobic MBBR.
Figure 12:
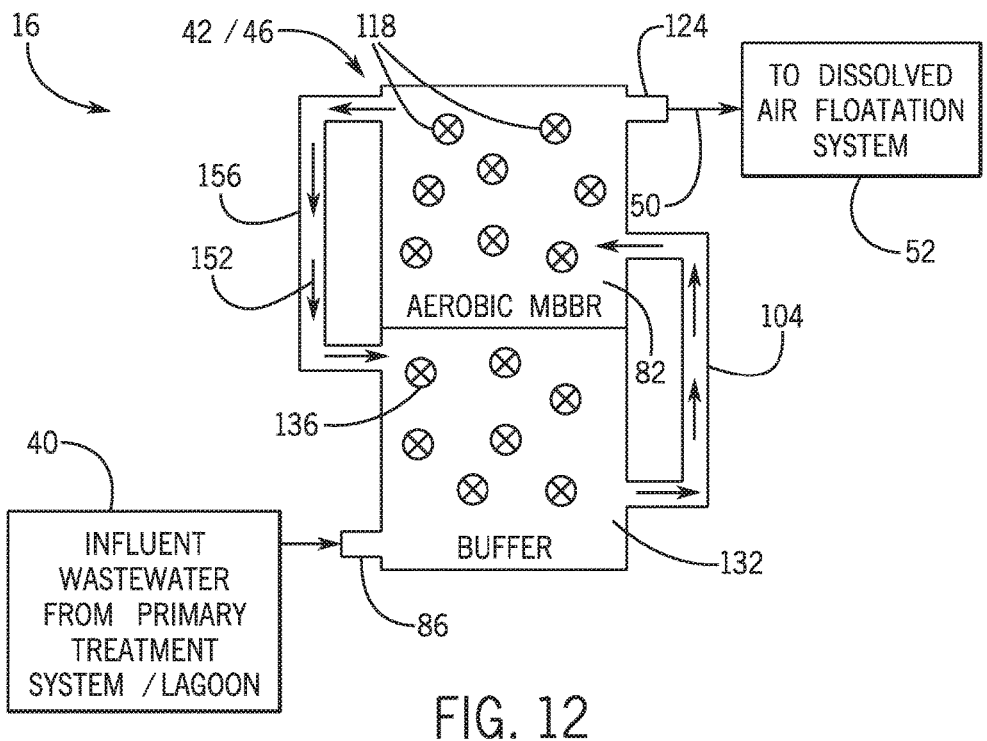
FIG. 12 is a diagrammatical view of an embodiment of a portion of the secondary treatment section of FIGS. 1 and 2, the secondary treatment section includes a stacked bio-reactor having the aerobic MBBR above a buffer reactor.
Figure 13:
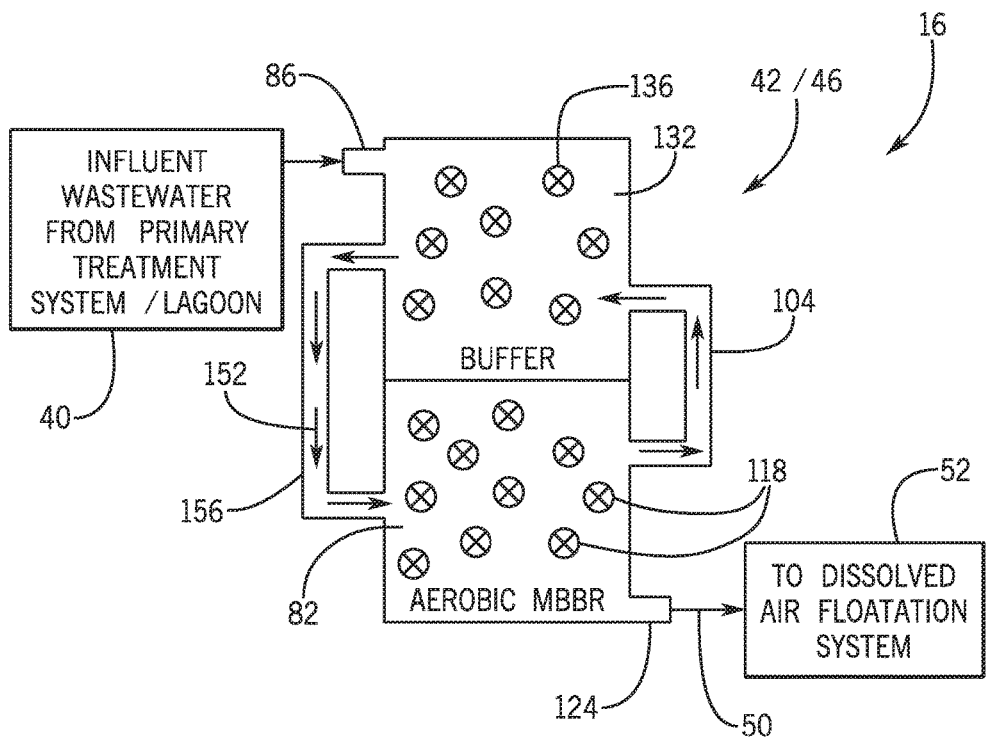
FIG. 13 is a diagrammatical view of an embodiment of a portion of the secondary treatment section of FIGS. 1 and 2, the secondary treatment section includes the stacked bio-reactor of FIG. 12 having the aerobic MBBR below the buffer reactor.
Figure 14:
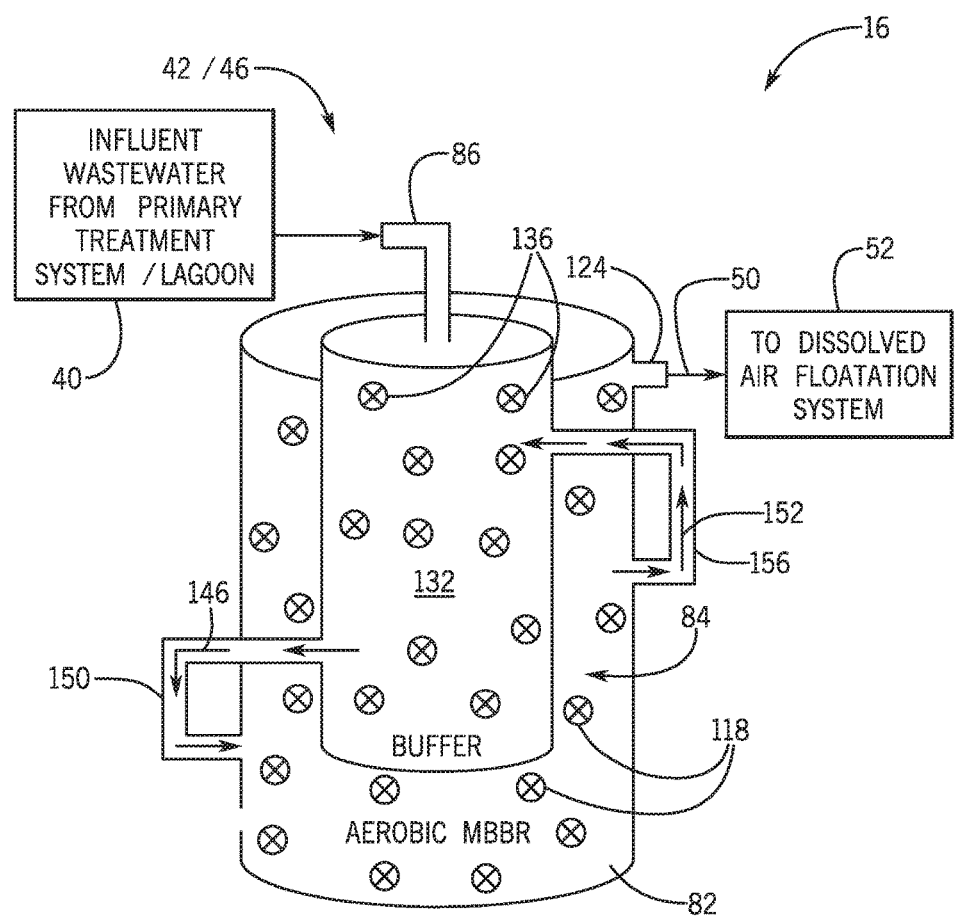
FIG. 14 is a diagrammatical view of an embodiment of a portion of the secondary treatment section of FIGS. 1 and 2, the secondary treatment section includes a bio-reactor having a buffer reactor surrounded by the aerobic MBBR.

In certain embodiments, the buffer reactor 132 may be integrated with both the anaerobic MBBR 80 and the aerobic MBBR 82. For example, as illustrated in FIG. 11, a first portion 170 of the buffer reactor 132 is integrated with the anaerobic MBBR 80 and a second portion 172 is integrated with the aerobic MBBR 82. By integrating the buffer reactor 132 with both the anaerobic and aerobic MBBR 80, 82, respectively, the overall size of the reactor 42, 46 may be decreased (e.g., be more compact). In addition, the reactors 80, 82, 132 may have desirable volumes of wastewater to maintain a robust and high throughput wastewater treatment process. As should be noted, in embodiments that include the buffer reactor 132, the reactor 42, 46 may include an anaerobic bypass line that feeds the wastewater 40 to the buffer reactor 132, rather than the anaerobic MBBR 80. Alternatively, the anaerobic MBBR 80 may be omitted, as illustrated in FIGS. 12 and 13.

Figure 15:
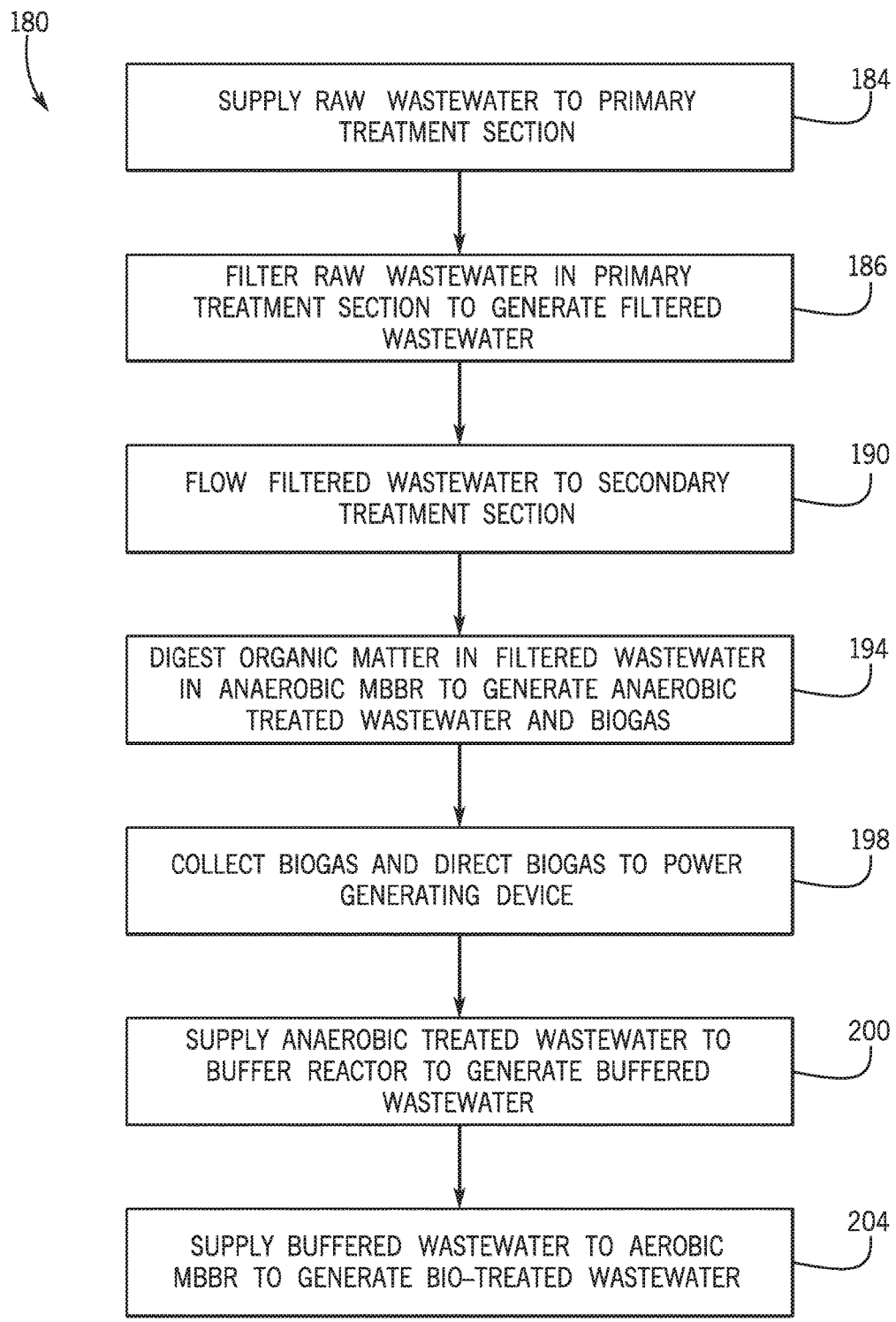
FIG. 15 is a flow diagram of an embodiment of a method for treating wastewater using the system of FIGS. 1 and 2.

Present embodiments also include a process that may utilize the system 10 to treat high strength wastewater to generate the biogas 90 and the treated wastewater 14 suitable for discharge into the environment (e.g., sea, river, lake, wet lands, ground, etc.). FIG. 15 illustrates a flow diagram of a process 180 by which a wastewater treatment system (e.g., the wastewater treatment system 10 described above) may treat wastewater having an organic loading of between approximately 0.1 kg COD/m³ and approximately 40 kg COD/m³ to generate treated wastewater (e.g., the bio-treated wastewater 50, 54). The process 180 may be implemented as executable code or computer instructions executable by the processor 70 and stored in the memory 72. The process 180 includes supplying the primary treatment section 16 with the raw wastewater 12 (block 184), and screening the raw wastewater 12 to generate the filtered wastewater 40 (block 186), as described above with reference to FIG. 1. As discussed above, the primary treatment section uses filters (e.g. the screen filter 28 and fine filters) to remove debris (e.g., trash) and solid particles having an average particles size greater than approximately 4 mm. In certain embodiments, the filtered wastewater 40 may be stored in storage tanks disposed downstream and fluidically coupled to the primary treatment section 16. In other embodiments, the filtered wastewater 40 may be stored in a retention pond/storage lagoon (e.g., the equalization tank 58), as discussed above with reference to FIG. 2.

The process 180 also includes flowing the filtered wastewater 40 to the secondary treatment section 18 (block 190), and digesting organic matter within the filtered wastewater 40 in the anaerobic MBBR 80 to generate the anaerobic treated wastewater 88 and the biogas 90 (block 194). In certain embodiments, the filtered wastewater 40 is supplemented with nutrients (e.g., nitrogen, phosphorus, or other suitable nutrients such as certain metal salts) before, during, or after flowing the wastewater 40 into the anaerobic MBBR. The nutrients may increase the treatment efficiency of the anaerobic MBBR by increasing bacterial growth on the bio-carriers 87 used to treat (e.g., breakdown/degrade) the organic matter. As such, the TOC in the anaerobic treated wastewater 88 is decreased by approximately 80% compared to high strength wastewater that has not been treated.

The process 180 further includes collecting the biogas 90 in the biogas collection unit 94 and directing the biogas 90 to the power generating device 98 (block 198). The power generating device 98 may use the biogas 90 to provide at least a portion of the energy for operating various system components, such as the anaerobic mixers and/or aeration blowers. In certain embodiments, the biogas 90 may be used to facilitate a flow of the anaerobic treated wastewater 88 to the anaerobic MBBR 82 or buffer rector 132. In this way, the overall cost and carbon footprint associated with operation of the system 10 may be decreased compared to systems that do not recover and use the biogas 90 to operate system components.

The process 180 also includes supplying the anaerobic treated wastewater 88 to the buffer reactor 132 (block 200). The buffer reactor 132 may condition the wastewater 88 before aerobic digestion in the aerobic MBBR 82. In addition, the buffer reactor 132 may decrease nitrogen levels in the wastewater 88 via de-nitrification processes. As discussed above, in certain embodiments the system 10 does not include the buffer reactor 132. As such, the anaerobic treated wastewater 88 flows from the anaerobic MBBR 80 to the aerobic MBBR 82.

The process 180 also includes supplying the third bio-treated wastewater 146 to the aerobic MBBR 82 to generate the bio-treated wastewater 50 (block 204). The aerobic MBBR 82 removes organic matter remaining in the wastewater 88, 146, such that the bio-treated wastewater 50, 54 has a suitable amount of TOC for discharge of the wastewater 88, 146 to the environment. In this way, the system 10 may be used to treat high strength wastewater (e.g., wastewater having between approximately 0.1 COD kg/m3 and approximately 40 COD kg/m³) efficiently and at a reduced cost compared to other wastewater treatment systems.

As described above, certain embodiments of the system 10 may include treating high strength wastewater (e.g., the wastewater 12) to generate a treated wastewater (e.g., the treated wastewater 14) suitable for discharge into the environment. That is, the system 10 removes undesirable contaminants (e.g., organic matter, nitrogen, etc.) from the wastewater 12 such that the treated wastewater 14 may be reused (e.g., for irrigation). The system 10 includes the reactor 42, 46 within the secondary treatment section 18 that conditions the wastewater 12 and removes organic matter and other undesirable components in the wastewater. For example, the reactor 42, 46 uses anaerobic and aerobic digestion to reduce or eliminate the TOC in the wastewater 12. The reactor 42, 46 may have various configurations that decrease the overall size of the reactor 42, 46, thereby decreasing the amount of real estate space the system 10 occupies. For example, the reactor 42, 46 may be a stacked integrated reactor with the anaerobic MBBR 80 being below or above the aerobic MBBR 80. In other configurations, the reactor 42, 46 may include an anaerobic MBBR (e.g., the MBBR 80) disposed within or surrounding an aerobic MBBR (e.g., the MBBR 82). Additionally, the reactor 42, 46 may include the buffer reactor 132 (e.g., an anoxic reactor) between the anaerobic MBBR 80 and the aerobic MBBR 82. The buffer reactor 132 may condition the wastewater 88 before aerobic digestion and remove nitrogen from the wastewater 50, 88 via nitrification/de-nitrification processes. The system 10 is also configured to recover and use the biogas 90 to provide at least a portion of the energy for operating system components (e.g., via the power generating device 98), thereby reducing the overall operational costs of the system 10.

To further reduce the overall real estate space occupied by the system 10, the secondary treatment section 18 may be fluidly coupled to the equalization tank 58 (e.g., a retention pond). The equalization tank 58 may store the filtered wastewater 40, thereby decreasing an amount of system components (e.g., storage tanks) used in the system 10. As such, the system 10 may be used in geographical areas/regions that have limited space for installation of a wastewater treatment system, such as the system 10.

This written description uses examples to disclose the present embodiments, including the best mode, and also to enable any person skilled in the art to practice the disclosed embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
receiving wastewater having a first total organic carbon (TOC) at a wastewater treatment system comprising a reactor system, wherein the reactor system comprises an anaerobic moving bed biofilm reactor (MBBR) and an aerobic MBBR, wherein the anaerobic and aerobic MBBR are vertically aligned with respect to each other, and wherein the anaerobic MBBR is disposed above the aerobic MBBR;

treating the wastewater in the anaerobic MBBR, wherein the anaerobic MBBR comprises first bio-carriers configured to degrade at least a portion of the first TOC in the wastewater to generate a first treated wastewater and biogas, wherein the first treated wastewater has a second TOC that is less than the first TOC; and providing the biogas to an external system.

2. The method of claim 1, wherein providing the wastewater to the reactor system comprises directing the wastewater from an equalization tank to the anaerobic MBBR.

3. The method of claim 1, comprising supplying the first treated wastewater to a buffer reactor disposed within the reactor system, wherein the buffer reactor comprises second bio-carriers configured to remove nitrogen from the first treated wastewater to generate a second treated wastewater.

4. The method of claim 3, comprising providing the second treated wastewater to the aerobic MBBR, wherein the aerobic MBBR comprises third bio-carriers configured to degrade at least a portion of the second TOC in the second treated wastewater to generate a third treated wastewater having a third TOC less than the second TOC.

5. The method of claim 1, comprising providing the first treated wastewater to the aerobic MBBR, wherein the aerobic MBBR comprises second bio-carriers configured to degrade at least a portion of the second TOC in the first treated wastewater to generate a second treated wastewater having a third TOC less than the second TOC.

6. The method of claim 1, wherein the anaerobic MBBR is partially or fully disposed within the aerobic MBBR such that the aerobic MBBR surrounds at least a portion of the anaerobic MBBR.

7. The method of claim 1, wherein the aerobic MBBR is partially or fully disposed within the anaerobic MBBR such that the anaerobic MBBR surrounds at least a portion of the aerobic MBBR.

8. The method of claim 1, comprising treating the wastewater with nutrients before, during, after, or a combination thereof, providing the wastewater to the reactor.

9. The method of claim 1, wherein the wastewater comprises an organic loading rate of between approximately 0.1 kilograms chemical oxygen demand/cubic meters (kg COD/m$^3$) and approximately 40 kg COD/m$^3$.

10. The method of claim 1, wherein the external system comprises a power production system, and wherein the power production system applies the biogas as fuel to at least partially operate the reactor system.

11. A water treatment system, comprising:
a reactor system disposed downstream from and fluidly coupled to a primary treatment system, wherein the primary treatment system is configured to treat a wastewater having a first total organic carbon (TOC), wherein the reactor system comprises:
an anaerobic moving bed biofilm reactor (MBBR) configured to receive the wastewater from the primary treatment system, the anaerobic MBBR comprising first bio-carriers configured to degrade at least a portion of the first TOC in the wastewater to generate a first treated wastewater and biogas, wherein the first treated wastewater comprises a second TOC that is less than the first TOC; and
an aerobic MBBR disposed downstream from and fluidly coupled to the anaerobic MBBR;
a buffer reactor disposed within the anaerobic MBBR or the aerobic MBBR and fluidly coupled to the anaerobic MBBR and the aerobic MBBR, wherein the buffer reactor comprises second bio-carriers configured to remove nitrogen from the first treated wastewater to generate a second treated wastewater; and
a fluid conduit fluidly coupling the reactor to an external system to provide the biogas to the external system.

12. The system of claim 11, comprising an equalization tank disposed within the primary treatment system, wherein the equalization tank is fluidly coupled to the anaerobic MBBR and configured to supply the anaerobic MBBR with the wastewater having the first TOC.

13. The system of claim 11, wherein the aerobic MBBR is configured to receive the second treated wastewater, and the second MBBR comprises third biocarriers configured to degrade at least a portion of the second TOC from the second treated wastewater to generate a third treated wastewater having a third TOC that is less than the second TOC.

14. The system of claim 11, comprising a recirculation conduit fluidly coupling the buffer reactor and the aerobic MBBR, wherein the recirculation conduit is configured to supply the third treated wastewater from the aerobic MBBR to the buffer reactor.

15. The system of claim 11, wherein the anaerobic MMBR and the aerobic MBBR are vertically aligned with respect to each other, and wherein the anaerobic reactor is disposed below the aerobic reactor.

16. The system of claim 11, wherein the anaerobic MBBR and the aerobic MBBR are vertically aligned with respect to each other, and wherein the anaerobic reactor is above the aerobic reactor.

17. The system of claim 11, wherein the anaerobic MBBR is disposed partially or fully within the aerobic MBBR such that the aerobic MBBR surrounds at least a portion of the anaerobic MBBR.

18. The system of claim 11, wherein the aerobic MBBR is disposed partially or fully within the anaerobic MBBR such that the anaerobic MBBR surrounds at least a portion of the aerobic MBBR.

19. The system of claim 11, comprising a controller configured to control operation of the reactor, wherein the controller comprises a processor configured to:
determine a TOC of the first treated wastewater, the second treated wastewater, or a combination thereof;
adjust a mixing rate, temperature, pressure, or combination thereof, of the reactor system based on the first TOC, the second TOC, or a combination thereof;
recirculate an effluent from the aerobic MBBR to a buffer reactor disposed downstream of the anaerobic MBBR; and
direct the biogas to the external system.

20. The system of claim 11, wherein the wastewater is treated with nutrients before, during, after, or a combination thereof, flowing the wastewater into the anaerobic MBBR.

21. The system of claim 11, wherein the wastewater comprises an organic loading rate of between approximately 0.1 kilograms chemical oxygen demand/cubic meters (kg COD/m$^3$) and approximately 40 kg COD/m$^3$.

22. The water treatment system of claim 11, comprising the external system, wherein the external system comprises a power production system, and wherein the power production system applies the biogas as fuel to at least partially operate the reactor system.

23. A reactor system, comprising:
an anaerobic moving bed biofilm reactor (MBBR) configured to receive wastewater having a first total organic carbon (TOC), the anaerobic MBBR comprising first bio-carriers configured to degrade at least a portion of the first TOC in the wastewater to generate a first treated wastewater and biogas, wherein the first treated wastewater comprises a second TOC that is less than the first TOC;

an aerobic MBBR disposed downstream from and fluidly coupled to the anaerobic MBBR; and a buffer reactor fluidly coupled to the anaerobic MBBR and the aerobic MBBR, wherein the buffer reactor is disposed within the anaerobic MBBR or the aerobic MBBR, wherein the buffer reactor is configured to receive the first treated wastewater and degrade at least a portion of the second TOC to generate a second treated wastewater.

24. The reactor system of claim 23, comprising a first conduit fluidly coupling the aerobic MBBR and the buffer reactor, wherein the first conduit is configured to direct the second treated wastewater to the aerobic MBBR, and wherein the aerobic MBBR is configured to degrade at least a portion of the second TOC to generated a third treated wastewater having a third TOC less than the second TOC.

25. The reactor system of claim 24, comprising a second conduit fluidly coupling the aerobic MBBR and the buffer reactor, wherein the second conduit is configured to direct at least a portion of the third treated wastewater to the buffer reactor.

26. The reactor system of claim 23, wherein the anaerobic MBBR and the aerobic MBBR are vertically aligned, and wherein the anaerobic MBBR is disposed below the aerobic MBBR.

27. The reactor of claim 23, wherein the anaerobic MBBR and the aerobic MBBR are vertically aligned, and wherein the anaerobic MBBR is disposed above the aerobic MBBR.

28. The reactor system of claim 23, wherein the anaerobic MBBR is disposed within the aerobic MBBR such that the aerobic MBBR surrounds at least a portion of the anaerobic MBBR.

29. The reactor system of claim 23, wherein the aerobic MBBR is disposed within the anaerobic MBBR such that the anaerobic MBBR surrounds at least a portion of the aerobic MBBR.

30. A water treatment system, comprising:
a reactor system disposed downstream from and fluidly coupled to a primary treatment system, wherein the primary treatment system is configured to treat a wastewater having a first total organic carbon (TOC), wherein the reactor system comprises:
an anaerobic moving bed biofilm reactor (MBBR) configured to receive the wastewater from the primary treatment system, the anaerobic MBBR comprising first bio-carriers configured to degrade at least a portion of the first TOC in the wastewater to generate a first treated wastewater and biogas, wherein the first treated wastewater comprises a second TOC that is less than the first TOC; and an aerobic MBBR disposed downstream from and fluidly coupled to the anaerobic MBBR;

a buffer reactor disposed within the reactor system and fluidly coupled to the anaerobic MBBR and the aerobic MBBR, wherein the buffer reactor comprises second bio-carriers configured to remove nitrogen from the first treated wastewater to generate a second treated wastewater;

a recirculation conduit fluidly coupling the buffer reactor and the aerobic MBBR, wherein the recirculation conduit is configured to supply the third treated wastewater from the aerobic MBBR to the buffer reactor fluid conduit fluidly coupling the reactor to an external system to provide the biogas to the external system.

31. A water treatment system, comprising:
a reactor system disposed downstream from and fluidly coupled to a primary treatment system, wherein the primary treatment system is configured to treat a wastewater having a first total organic carbon (TOC), wherein the reactor system comprises:
an anaerobic moving bed biofilm reactor (MBBR) configured to receive the wastewater from the primary treatment system, the anaerobic MBBR comprising first bio-carriers configured to degrade at least a portion of the first TOC in the wastewater to generate a first treated wastewater and biogas, wherein the first treated wastewater comprises a second TOC that is less than the first TOC; and an aerobic MBBR disposed downstream from and fluidly coupled to the anaerobic MBBR, wherein the anaerobic MBBR and the aerobic MBBR are vertically aligned with respect to each other, and wherein the anaerobic reactor is above the aerobic reactor;

fluid conduit fluidly coupling the reactor to an external system to provide the biogas to the external system.

32. A water treatment system, comprising:
a reactor system disposed downstream from and fluidly coupled to a primary treatment system, wherein the primary treatment system is configured to treat a wastewater having a first total organic carbon (TOC), wherein the reactor system comprises:
an anaerobic moving bed biofilm reactor (MBBR) configured to receive the wastewater from the primary treatment system, the anaerobic MBBR comprising first bio-carriers configured to degrade at least a portion of the first TOC in the wastewater to generate a first treated wastewater and biogas, wherein the first treated wastewater comprises a second TOC that is less than the first TOC; and an aerobic MBBR disposed downstream from and fluidly coupled to the anaerobic MBBR; and a fluid conduit fluidly coupling the reactor to an external system to provide the biogas to the external system; and a controller configured to control operation of the reactor, wherein the controller comprises a processor configured to:
determine a TOC of the first treated wastewater, the second treated wastewater, or a combination thereof;
adjust a mixing rate, temperature, pressure, or combination thereof, of the reactor system based on the first TOC, the second TOC, or a combination thereof;
recirculate an effluent from the aerobic MBBR to a buffer reactor disposed downstream of the anaerobic MBBR; and
direct the biogas to the external system.

33. A reactor system, comprising:
an anaerobic moving bed biofilm reactor (MBBR) configured to receive wastewater having a first total organic carbon (TOC), the anaerobic MBBR comprising first bio-carriers configured to degrade at least a portion of the first TOC in the wastewater to generate a first treated wastewater and biogas, wherein the first treated wastewater comprises a second TOC that is less than the first TOC;

an aerobic MBBR disposed downstream from and fluidly coupled to the anaerobic MBBR, wherein the anaerobic MBBR and the aerobic MBBR are vertically aligned, and wherein the anaerobic MBBR is disposed above the aerobic MBBR; and a buffer reactor fluidly coupled to the anaerobic MBBR and the aerobic MBBR, and disposed between the anaerobic MBBR and the aerobic MBBR, wherein the buffer reactor is configured to receive the first treated wastewater and degrade at least a portion of the second TOC to generate a second treated wastewater.

34. A reactor system, comprising:

an anaerobic moving bed biofilm reactor (MBBR) configured to receive wastewater having a first total organic carbon (TOC), the anaerobic MBBR comprising first bio-carriers configured to degrade at least a portion of the first TOC in the wastewater to generate a first treated wastewater and biogas, wherein the first treated wastewater comprises a second TOC that is less than the first TOC;

an aerobic MBBR disposed downstream from and fluidly coupled to the anaerobic MBBR, wherein the anaerobic MBBR is disposed within the aerobic MBBR such that the aerobic MBBR surrounds at least a portion of the anaerobic MBBR; and a buffer reactor fluidly coupled to the anaerobic MBBR and the aerobic MBBR, and disposed between the anaerobic MBBR and the aerobic MBBR, wherein the buffer reactor is configured to receive the first treated wastewater and degrade at least a portion of the second TOC to generate a second treated wastewater.

35. A reactor system, comprising:

an anaerobic moving bed biofilm reactor (MBBR) configured to receive wastewater having a first total organic carbon (TOC), the anaerobic MBBR comprising first bio-carriers configured to degrade at least a portion of the first TOC in the wastewater to generate a first treated wastewater and biogas, wherein the first treated wastewater comprises a second TOC that is less than the first TOC;

an aerobic MBBR disposed downstream from and fluidly coupled to the anaerobic MBBR, wherein the aerobic MBBR is disposed within the anaerobic MBBR such that the anaerobic MBBR surrounds at least a portion of the aerobic MBBR; and a buffer reactor fluidly coupled to the anaerobic MBBR and the aerobic MBBR, and disposed between the anaerobic MBBR and the aerobic MBBR, wherein the buffer reactor is configured to receive the first treated wastewater and degrade at least a portion of the second TOG to generate a second treated wastewater.

* * * * *